Aug. 4, 1959

N. L. BROATCH 2,897,679

ELECTRICALLY CONTROLLED CLUTCH

Filed Aug. 2, 1956

INVENTOR.
NELSON L. BROATCH

BY
ATTORNEYS

Aug. 4, 1959 N. L. BROATCH 2,897,679
ELECTRICALLY CONTROLLED CLUTCH
Filed Aug. 2, 1956 3 Sheets-Sheet 2

INVENTOR.
NELSON L. BROATCH
BY
ATTORNEYS

Aug. 4, 1959 N. L. BROATCH 2,897,679
ELECTRICALLY CONTROLLED CLUTCH
Filed Aug. 2, 1956 3 Sheets-Sheet 3

INVENTOR.
NELSON L. BROATCH
BY
ATTORNEYS

2,897,679

ELECTRICALLY CONTROLLED CLUTCH

Nelson L. Broatch, Torrance, Calif., assignor to the United States of America as represented by the Secretary of the Air Force Application August 2, 1956, Serial No. 601,847

2 Claims. (Cl. 74—125.5)

This invention relates to a driving mechanism wherein a continuously turning shaft acts as means for rotating a shaft which is normally held stationary. More particularly, the invention provides means for operating a camera or other device from a continuously rotating shaft by including clutch means for engaging and disengaging the driven shaft from said continuously rotating shaft.

In aerial photography, exposures are made in rapid succession and a necessary requirement is the precise timing of the shutter and film movements with each other. That is, the film must be held perfectly stationary during the time the shutter is open and, after the shutter closes, the film must move rapidly to bring the next succeeding frame into its proper position with respect to the shutter and must be brought to rest before the shutter reopens. This type of movement usually requires the translation of direct rotary motion of a continuously rotating shaft through an engaging and disengaging means to a normally stationary shaft which controls the shutter and film movements.

The object of the invention is to provide a positive and relatively simple means having a minimum of moving parts for permitting rotation of a normally stationary shaft from a continuously rotating shaft.

Another object of the invention is the provision of a mechanism for automatically controlling film movement and shutter position by rotating a normally stationary shaft through operator controlled means by a continuously driven shaft.

A further object of the invention is to provide a means for positively starting and stopping the rotation of a normally stationary shaft at predetermined locations of its cycle.

A still further object of the invention is to provide a combination of solenoid and cam means for alternately engaging and disengaging a pawl member from a constantly turning toothed disc.

These and other advantages, features and objects of the invention will become more apparent from the following description taken in connection with the illustrative embodiments in the accompanying drawings wherein.

Figure 1:
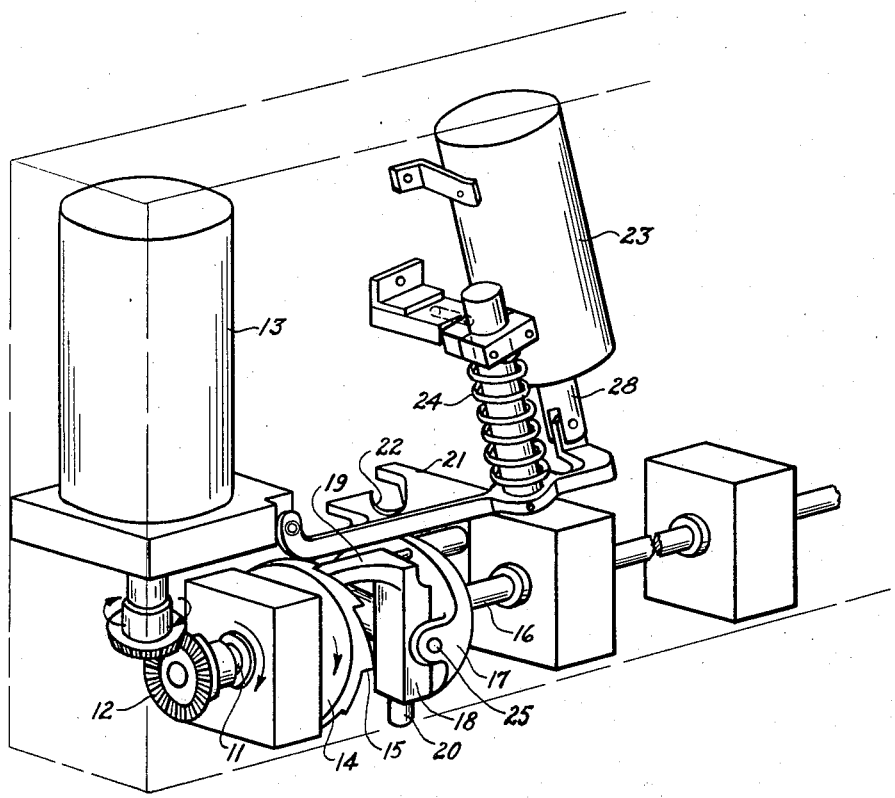
Fig. 1 is a pictorial isometric drawing showing the assembled mechanism with the pawl and ratchet in the engaged position so that the intermittently rotatable shaft rotates simultaneously with the continuously rotating shaft.

The illustrated embodiment of the invention, as shown in Fig. 1, is arranged preferably to be used in conjunction with the shutter operating and film transporting mechanism of an aerial camera wherein successive exposures are made of the terrain over which the plane is flying. Since exposures are made in rapid succession, the film transport mechanism of the camera must be positively stopped and locked in position to prevent film movement during shutter operation. To accomplish this result, the invention contemplates means arranged to form a driving connection between a continuously rotating driving shaft 11 and a normally stationary driven shaft 16 which operates as the driving means for the film transport mechanism and which is arranged to be disconnected from the continuously rotating shaft 11 and locked in position to prevent further rotation of the driven shaft 16 after the shutter operation has been completed.

The present invention, as illustrated in the drawings, comprises a continuously rotating shaft 11 which is driven by an electric motor 13 or other suitable means through suitable motion transmitting means such as gears 12. The shaft 16 is driven by the shaft 11 through suitable connections including a ratchet wheel 14 having on one face thereof ratchet teeth 15 engaged by a suitable pawl 19. Preferably, the ratchet wheel 14 is fixed to the continuously rotating driving shaft 11 and the pawl 19 is pivotally mounted on a disc member 17 fixed to the shaft 16. The pawl 19 is pivotally attached to the ears of the disc 17 by a pin 25.

Figure 4:
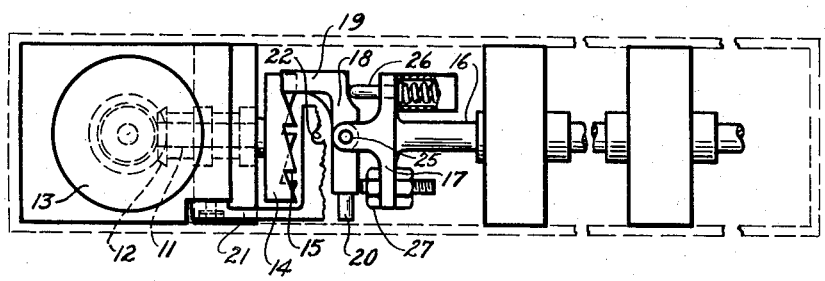
Fig. 4 is the top view of assembly as shown in Fig. 3 with the actuator system omitted so that the details of the pawl and ratchet arrangement may be seen more clearly.
Figure 5:
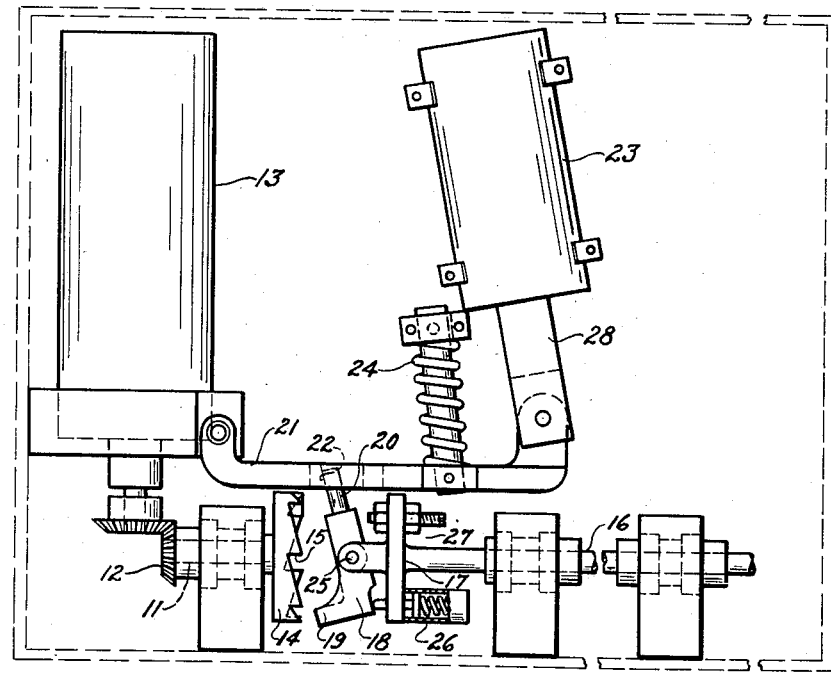
Fig. 5 is a view similar to Fig. 3 in side elevation of the assembly showing the pawl and ratchet in the disengaged position. Also it may be noted that the actuator is not energized and the pawl is being held out of engagement with the ratchet.

The pawl 19 is normally urged into engagement with the ratchet teeth 15 by a spring urged plunger 26 more clearly shown in Figs. 4 and 5 and, at the end of an operating cycle, is held away from and out of engagement with the ratchet teeth 15 by a pivotable member 21 having a cam slot 22 therein. The pivotable member 21 is normally maintained in pawl engaging position by a biasing spring 24 and is moved out of said position by a movable armature 28 actuated by energizing a solenoid 23.

The solenoid 23 may be energized in any suitable portion of the cycle but it is preferred that it be energized during the last portion of the shutter operation so that the cam member 21 may be moved out of the film transport locking position shown in Fig. 5 to permit the pawl to engage a tooth on the ratchet wheel 14 to cause the shaft 16 to be rotated 360° to feed an unexposed portion of film into exposing position.

Figure 2:
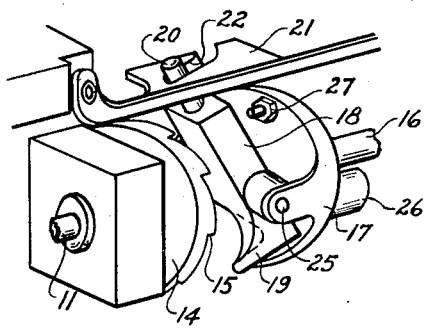
Fig. 2 is a view of the pawl and ratchet mechanism shown in Fig. 1 in the disengaged position and rotated 180° from the position shown in Fig. 1. With the pawl and ratchet arranged as in this view, the driven shaft is in its normal stationary position.

Fig. 2 shows the pawl member 18 and its carrier, disc member 17, in a position rotated 180° from Fig. 1. The relative placement of the parts when the two shafts 11 and 16 are disengaged from each other, with shaft 11 turning alone, is also shown. It will be noted that the pawl member 18 is disengaged from the continuously turning toothed disc member 14 and, since the cam plate 21 is in engagement with the projecting portion 20, the tooth 15 and the pawl 19 are out of contact with each other.

Figure 3:
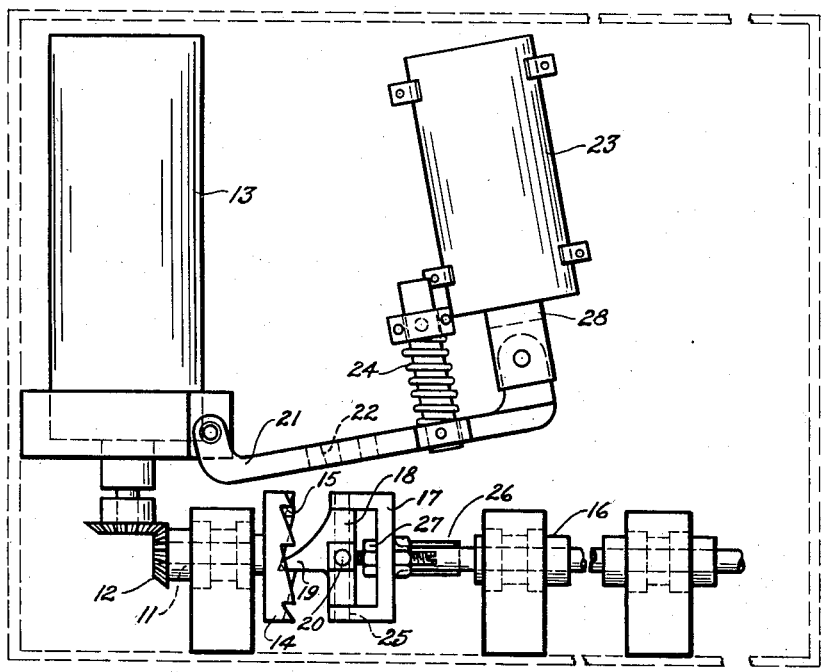
Fig. 3 is a view in side elevation of the assembly showing the pawl and ratchet in the engaged position, 90° from the "at rest" position as shown in Fig. 2. Also shown is the actuator in the energized position having released the pawl a short time before.

Fig. 3 is a side elevation of the assembly showing the pawl 19 in an engaged position and turned 90° from the starting point. The solenoid 23, to which the cam 21 is attached, is in a remote position from the projecting portion 20 of the pawl member 18.

Fig. 4 is a top view of the assembly which is shown in Fig. 3. Here, the biasing arrangement can be clearly seen for urging and holding the pawl 19 in engagement with the ratchet member 14. Also, there is depicted the stop 27 which prevents the pawl and ratchet system from jamming.

In Fig. 5 the normal or disengaged position is shown, where solenoid 23 is inactive and the biasing spring 24 is holding the pivoted member 21 in the near position to member 18, and the projecting portion 20 is in contact with the cam slot 22. Thus, the pawl portion 19 is out of contact with the toothed driving disc 14 and the shaft 16 is stationary.

Figure 6:
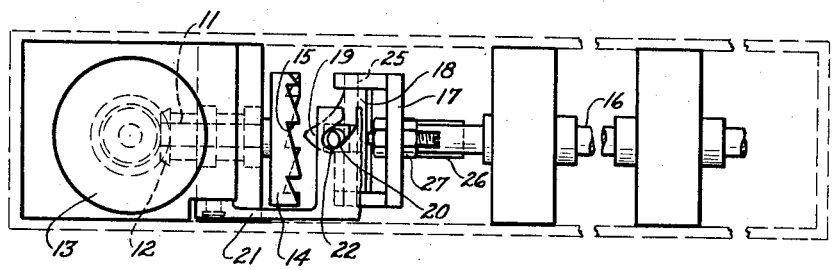
Fig. 6 is a top view of the assembly as depicted in Fig. 5 with the actuator assembly omitted for the sake of clarity.

Fig. 6 shows a top view of the mechanism but does not include the solenoid system. As shown, the shaft 16 is stationary and the pawl and ratchet are out of engagement with each other.

Figure 7:
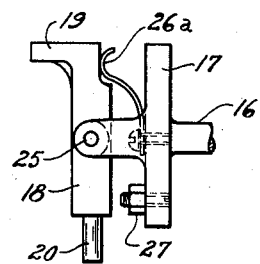
Fig. 7 shows an alternate spring arrangement for urging the pawl into engagement with the ratchet after the pawl has been released from its "at rest" position by the action of the actuator and for holding the pawl in engagement for the duration of the cycle.

Fig. 7 shows an alternate spring pressure arrangement for holding the detent or pawl portion 19 of the assembly against the toothed disc member 14 of the continuously turning shaft 11 in such a manner that said shaft 11 operates to drive shaft 16 which in turn controls the movements within the camera or other driven device.

During a typical cycle of operation, the following series of mechanical actions takes place. The motor 13 continuously rotates, driving the shaft 11 through the gears 12. To start the shaft 16 turning, the solenoid 23 is momentarily energized by the operator at the proper instant by closing a switch (not shown) which sends current flowing through the solenoid winding. This causes the cam member 21, which is pivotally secured to a fixed portion of the assembly, to move away from the member 18 thereby causing the cam surface 22 to disengage itself from the projecting portion 20 of said member 18. When this occurs, the spring associated with the pawl 19 urges it to pivot on its pin 25 away from the member 17 and toward the disc member 14. The pawl then moves against the disc member 14 which is rigidly attached to the continuously rotating shaft 11. In this position one of the plurality of teeth 15 will pick up the pawl 19 so that the member 17 and the shaft 16 are caused to rotate together with the shaft 11.

Thus, the motor is now driving the shaft 16 through the engaged pawl and ratchet arrangement. A short time later in the cycle the solenoid 23 is deenergized and the biasing spring 24 returns the cam 21 back to its normal position in the assembly nearer to the member 18. As the shaft 16 and the associated member 18 rotate and the cycle nears completion, the projecting portion 20 of the member 18 contacts the cam member 21 and engages the inclined cam surface 22, as illustrated in Fig. 2.

The inclined cam surface 22 is shaped in such a manner that as the projecting portion 20 of the member 18 engages with said cam surface 22, the member 18 is caused to pivot on its trunnion 25 relative to the member 17. This results in the disengagement of the pawl portion 19 from the tooth 15 of the disc member 14. When this occurs the member 18 and thus shaft 16 are brought to a halt and no longer rotate with the driving shaft 11.

In normal operation cam member 21 will be pivoted away from the member 18 by the solenoid 23 only momentarily, which is a sufficient period of time to permit the projecting portion 20 to disengage from the cam surface 22 and to allow the spring to force pawl 19 into engagement with the member 14. Shaft 16 will begin rotation at once and will continue to rotate for one complete revolution. If cam member 21 has been returned to the original position, the projecting portion 20 of the member 18 will engage the cam surface 22 at the completion of one revolution causing the pawl 19 to disengage from the tooth 15, as previously described.

Although the invention has been described with reference to particular embodiments, it will be understood to those skilled in the art that various changes and modifications can be made therein without departing from the spirit of the present invention. I intend, therefore, to be limited only by the full scope and spirit of the appended claims.

Having thus described my invention what I claim as new and desire to secure by Letters Patent of the United States is:

1. A clutch mechanism comprising a continuously rotating driving member, a normally stationary driven member, a plurality of ratchet teeth equally spaced on one face of said driving member, a pawl member pivotally mounted on said driven member and arranged to be swung into and out of engagement with said ratchet teeth, said pawl member being provided with an integral cam engaging portion, a flat cam member having a shaped cut-out portion for interlocking with the cam engaging portion of said pawl, said cam member being pivotally mounted on a fixed portion of said clutch mechanism and arranged for movement in a plane extending through the axis of rotation of said clutch mechanism into contact with said cam engaging portion for swinging said pawl out of engagement with said ratchet, and means effective at the will of the operator to swing said cam member out of contact with the cam engaging portion of said pawl member to permit engagement of said pawl with said ratchet.

2. A clutch mechanism comprising a continuously rotating driving member, a normally stationary driven member, a plurality of ratchet teeth equally spaced on one face of said driving member, a pawl member, ears on one face of said driven member for supporting said pawl member for swinging movement into and out of engagement with said ratchet teeth, biasing means for swinging said pawl into engagement with said ratchet, a cam engaging member fixed to said pawl member, a flat cam member having a shaped cut-out portion for interlocking with said cam engaging member; said cam member being pivotally mounted on a fixed portion of said clutch mechanism and arranged for movement in a plane extending through the axis of rotation of said clutch mechanism into contact with said engaging member for swinging said pawl out of engagement with said ratchet, and a solenoid attached to said cam member being effective at the will of the operator to move said cam member out of contact with the cam engaging member on said pawl member to permit engagement of said pawl with said ratchet.

References Cited in the file of this patent

UNITED STATES PATENTS

| | | |
|---|---|---|
| 886,004 | Lothrop | Apr. 28, 1908 |
| 1,759,630 | Rinaldy | May 20, 1930 |
| 2,368,892 | Skoog | Feb. 6, 1945 |
| 2,475,740 | Goodwin et al. | July 12, 1949 |
| 2,734,604 | Soave | Feb. 14, 1956 |
| 2,775,129 | Peras | Dec. 25, 1956 |